United States Patent [19]

Herbert et al.

[11] 4,098,527

[45] Jul. 4, 1978

[54] TENSION BEARING CONNECTOR

[75] Inventors: John T. Herbert; Frank J. Kovitch, both of Arlington; Paul E. Sullivan, Euless, all of Tex.

[73] Assignee: Murdock Machine & Engineering Company, Irving, Tex.

[21] Appl. No.: 760,867

[22] Filed: Jan. 21, 1977

[51] Int. Cl.[2] .............................................. F16L 27/04
[52] U.S. Cl. .................................... 285/167; 285/234; 403/133; 403/226
[58] Field of Search .................. 285/49, 167, 224, 233, 285/234, 235; 403/133, 130, 132, 228, 225, 131, 128, 226

[56] References Cited

U.S. PATENT DOCUMENTS

| 1,343,445 | 6/1920 | Gaffers | 52/657 |
|---|---|---|---|
| 3,390,899 | 7/1968 | Herbert et al. | 285/45 |
| 3,504,904 | 4/1970 | Irwin et al. | 285/223 X |
| 3,680,895 | 8/1972 | Herbert et al. | 285/167 |
| 3,734,546 | 5/1973 | Herbert et al. | 285/49 |
| 3,818,672 | 6/1974 | Moore, Sr. | 403/295 |
| 3,853,337 | 12/1974 | Herbert et al. | 285/49 |

FOREIGN PATENT DOCUMENTS

| 224,213 | 7/1959 | Australia | 403/133 |
|---|---|---|---|
| 1,000,117 | 11/1976 | Canada | 403/402 |

Primary Examiner—Andrew V. Kundrat
Attorney, Agent, or Firm—Richards, Harris & Medlock

[57] ABSTRACT

A flexible tension bearing connector includes a cylinder having a base portion supporting a central rigid spacer therein having an outer spherical surface facing away from the base portion and a center of curvature at the axis of the cylinder. A nipple has an internal spherically shaped surface contiguous to the spacer in a mating relation. An elastomeric bearing has an end inner ring which has a cylindrical center bore to receive the nipple and an end outer ring captured inside the cylinder. An intermediate elastomeric section has spherical geometry centered at the center of curvature of the spacer. The bearing encircles the nipple with annular planar bearing surface facing away from the spaces in a plane normal to the cylinder axis. A stop on the nipple contacts the annular planar bearing surface to transfer through the bearing to the cylinder any forces which would urge the bearing away from the spacer.

12 Claims, 5 Drawing Figures

TENSION BEARING CONNECTOR

FIELD OF THE INVENTION

This invention relates to connectors of structural members, and more particularly to a flexible connector for joining rigid structural members subjected to tensile, compressive and lateral forces.

U.S. Pat. No. 3,734,546 discloses a flexible pipe connector of the general type to which the present invention pertains. There exists a need in flow as well as non-flow systems for a flexible tension bearing connector in which load transfer capability is enhanced relative to prior systems without inhibiting the flexibility of the coupling.

PRIOR ART

In the drilling and operation of oil wells in marine areas requiring the use of floating surface structures, a casing generally is set in a relatively hollow borehole with the mouth of the casing at the sea floor. Casing sections leading from the surface structure are coupled to provide a conduit to the floor casing. Further, the surface structure is anchored to remain in near proximity to a surface casing. In this environment, a flexible connector is required which can withstand high tensile and compressive loads while permitting angular deflection between interconnected members. The connector may be used not only as a casing joint, but also as an anchor cable termination for relieving the bending stress in the cable.

Flexible pipe connectors for transporting of various fluids, have been provided which use elastomeric elements to accommodate deflection of rigid pipes at a joint. Representative of such structures are the joints illustrated and described in U.S. Pat. Nos. 3,390,899; 3,680,895; 3,734,546; 3,853,722 and 3,853,337.

In copending application Ser. No. 696,396, filed June 15, 1976, copending application Ser. No. 683,635, filed May 5, 1976 and copending application Ser. No. 701,088, filed June 30, 1976, assigned to the assignee of the present invention, flexible connectors capable of withstanding both compressive loads and lateral deflections are described and claimed.

The present invention provides a structure uniquely capable of interconnecting structural members or terminating cables in an environment of high tensile, compressive and lateral loads such as may be encountered in drilling or production oil wells at the ocean floor. An inherent simple structure is available because the connector will not normally be employed as internal fluid pressure containing members.

SUMMARY OF THE INVENTION

The present invention is directed to a flexible connector including a cylindrical housing, and a pair of confronting nipples substantially axially aligned with and depending into the housing. Each of the nipples has an inner bore and a flared end. The inner surfaces of the flared ends mate slidably with the outer spherical surface of a central and rigid spacer which may have an inner bore axially aligned with the inner bores of the nipples. Inner collars encircle the flared end of each nipple, and are supported by transverse planar shoulders on each nipple to oppose movement away from the spacer. Elastomeric bodies comprised of an assembly of concentric metallic or other reinforcing type material spherical shaped segment of rings radially spaced apart by elastomeric pads are adhered to the outer spherical surfaces of each of the inner collars. The elastomeric bodies also are adhered to the spherical surfaces of outer collars engaging the inner surface of the housing. The outer collars are captured within the housing by retainers.

Angular deviation between the longitudinal axes of the confronting nipples is accommodated by making the outer spherical surfaces of the spacer ring, the inner spherical surfaces of the flared ends of the nipples, the outer spherical surfaces of the inner collars, the rings of the elastomeric body and the inner spherical surfaces of the outer collars concentric with respect to a common point located on the longitudinal axis of the housing and at the center of the spacer.

In one embodiment of the invention, one end of the housing is closed off by a base plate having a spacer with an inwardly directed and centrally located rigid spherical surface. The spherical surface mates slidably with inner spherical surfaces of a nipple. The spherical geometry of the connector is concentric to the spherical surface of the spacer.

DESCRIPTION OF THE DRAWINGS

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

DESCRIPTION OF PREFERRED EMBODIMENTS

Figure 1:
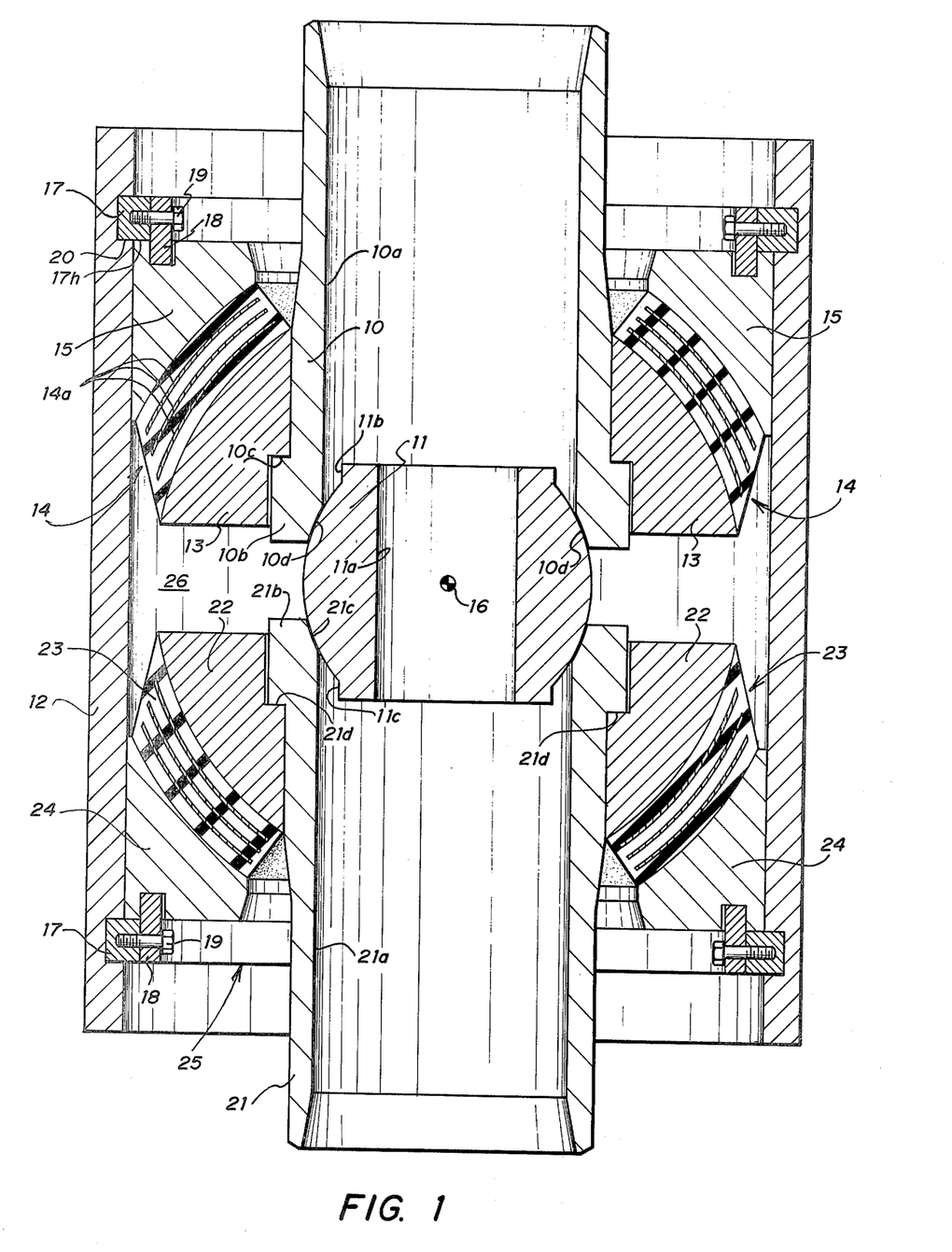
FIG. 1 is a cross-sectional view of a double acting connector embodying the invention.

FIG. 1 illustrates a preferred embodiment of the invention. Referring to FIG. 1, a nipple 10 has an inner bore 10a and an outwardly flared portion 10b with a shoulder 10c. An inner spherical surface 10d of the nipple is slidably mated to an outer spherical surface of a rigid spacer ring 11. The spacer ring is centrally located within a cylindrical housing 12 and includes an inner bore 11a axially aligned with the longitudinal axis of the housing. The bore is subtended at either end by cylindrical necks of ring 11 forming longitudinal stops 11b and 11c.

An inner collar 13 engages and encircles the flared end of nipple 10, and is supported against movement toward the spacer ring by shoulder 10c.

An elastomeric body 14 is adhered to the outer spherical surface of collar 13 and to the inwardly facing spherical surface of an outer collar 15. The outer collar 15 is in sliding relation with the inner surface of housing 12.

The elastomeric body 14 includes an assembly of spaced apart and structurally stiff rings 14a, which preferably are of metal. The rings are spaced apart one from another by elastomeric pads, and are completely encased within the elastomeric body. The inwardly directed spherical surface of collar 15, the rings of body 14, the outer spherical surface of collar 13 and the inner surface 10d of nipple 10 are concentric to a common point 16. Point 16 is located on the longitudinal axis of housing 12 and centered within the spacer ring 11.

Figure 1A:
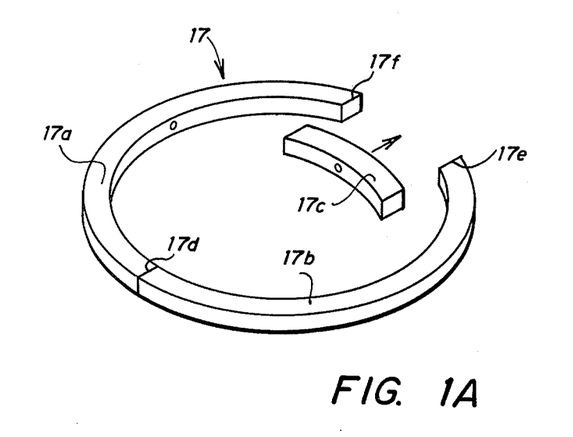
FIG. 1A is an exploded isometric view of the locking detail of FIG. 1.

Collar 15 is captured in housing 12 by a retainer ring 17. Locking ring 17 is best shown in FIG. 1A. Ring 17 comprises three segments 17a, 17b and 17c. The three segments form a continuous ring which may be inserted into a groove 20 in the wall of cylinder 12. The segments 17a and 17b are substantially greater length than segment 17c. The rings are segmented along planes that are parallel there being a radial cut 17d and two cuts 17e and 17f parallel to cut 17d. With segment 17c removed, segments 17a and 17b may then be slipped into the cylinder 12 and spread outward into the groove 20. The segment 17c then may be inserted.

Thereafter, a continuous unitary ring 18 whose outer diameter is exactly equal the inner diameter of rings 17a, 17b and 17c, is inserted. Bolts 19 pass through ring 18 and are served into threaded holes in the segments 17a, 17b and 17c. By this means, a substantially continuous annular surface 17h forms a load bearing surface for the transfer of forces from the collar 15 to the cylinder 12.

A lower nipple 21 having an inner bore 21a depends into housing 12 in opposing relation to nipple 10. The nipple 21 has an outward flaring end 21b and an inner spherical surface 21c in sliding relation with the outer spherical surface of spacer ring 11. An inner collar 22 encircles the flared end of nipple 21, and abuts shoulder 21d which opposes movement toward the spacer ring 11.

An elastomeric body 23 is bonded to the outer spherical surface of collar 22 and to the inwardly directed spherical surface of an outer collar 24. The outer collar 24 is in sliding relation with the inner surface of housing 12. The collar 24 encircles nipple 21, and is captured within the housing 12 by a retainer 25. The construction of retainer 25 and body 23 are the same as that of retainer 17 and body 14, respectively.

In operation, structural members which are to be interconnected are joined to nipples 10 and 21. The elastomeric body 14 coacts with collars 13 and 15, and the elastomeric body 23 coacts with collars 22 and 24 to form flexible elastomeric bearings. When the nipples 10 and 21 experience a tensile load, the bodies 14 and 23 are compressed. If a compressive load occurs, the inner surfaces of nipples 10 and 21 are applied against the spacer ring 11. Further, with the spherical geometry of the connector centered at the common point 16, angular deviation between the longitudinal axes of nipples 10 and 21 may be accommodated with no wear to the elastomeric bearings and to interfacing structural surfaces. The stops 11b and 11c limit the angular deflection of spacer ring 11 when lateral loads are applied to the connector.

It will be seen that the connector of FIG. 1 may be used to interconnect conduits having fluid flowing therein. Collars 15 and 24 may be placed in sealed relation with the inner surface of housing 12 by well known means, and collars 13 and 22 may be placed in sealed relation with nipples 10 and 21, respectively. Liquid flowing through nipples 10 and 21 is thereby prevented from mixing with the external environment. Further, the stops 11b and 11c act to maintain a liquid path between the nipples. However, it will be noted that the flow capacity will be limited by the area of the point through the spacer ring 11. Normally the connectors of the present invention will be employed for tension-load bearing operations where fluid flow is not present.

Figure 2:
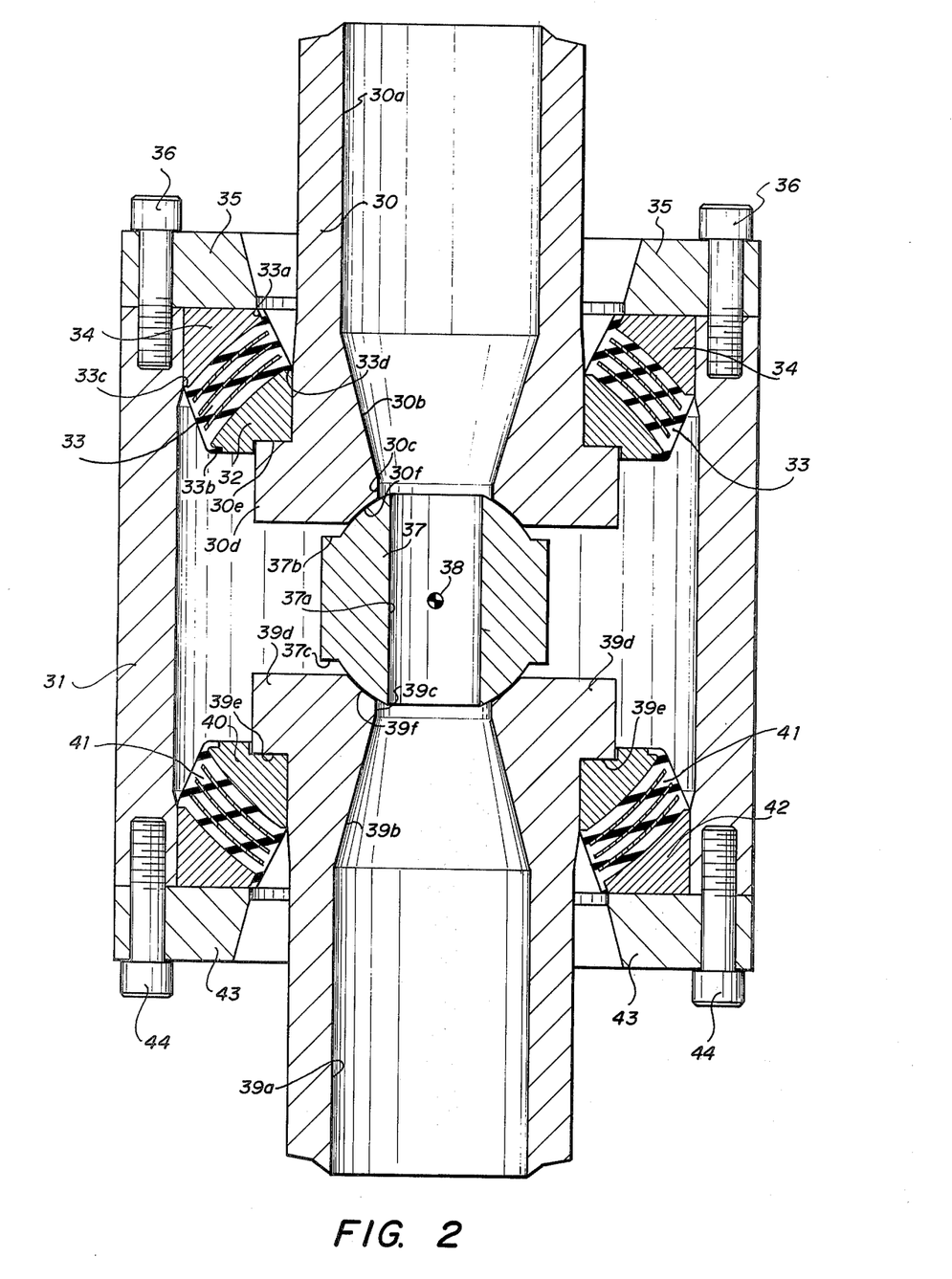
FIG. 2 is a cross-sectional view of a modified form of the embodiment of FIG. 1.

Referring to FIG. 2, a second embodiment of the invention is illustrated. A nipple 30 depends into a cylindrical housing 31. The nipple 30 has an inner cylindrical bore 30a leading to a conical inner bore 30b. Bore 30b converges to a cylindrical bore 30c near the end of the nipple. The end of the nipple flares outward to form a flared portion 30d having a shoulder 30e.

A collar 32 encircles a portion of the flared portion 30d, and abuts shoulder 30e. An elastomeric body 33 is bonded to the outer spherical surface of collar 32 and to the inner spherical surface of an outer collar 34 encircling the nipple. The elastomeric body 33 is of the same type of construction as that before described with bodies 14 and 23. Body 33 further includes diametrically opposite fingers 33a and 33b which wrap around corners of collar 34 and collar 32, respectively. The fingers 33a and 33b supplement a bonding agent in securing the body 33 to collars 32 and 34. Body 33 further includes diametrically opposite protrusions 33c and 33d. The collars 32 and 34 cooperate with elastomeric body 33 to form an elastomeric bearing for nipple 30.

The collar 34 slidably engages the inner surface of housing 31, and is captured within the housing by a retainer ring 35 which is secured by threaded fasteners 36 to an end of the housing 31. However, structure involving ring 17 of FIG. 1 is preferred because of the load carrying capacity is greater than that of fasteners.

An inner spherical surface 30f of nipple 30 is slidably mated to an outer spherical surface of a rigid spacer ring 37. Surface 30f, the outer spherical surface of collar 32, the rings of body 33, and the inner spherical surface of collar 34 have a common center of curvature at point 38. Point 38 is central to spacer ring 37 and located on the longitudinal axis of housing 31.

The spacer ring 37 includes an inner cylindrical bore 37a which is axially aligned with the longitudinal axis of housing 31 and of a size smaller than the bore 30c. The outer surface of spacer ring 37 includes a first transverse stop 37b and a second transverse stop 37c.

A second nipple 39 depends through the opposite end of housing 31 in opposing relation to the nipple 30. Nipple 39 includes an inner cylindrical bore 39a leading to a conically shaped inner bore 39b. The bore 39b in turn converges toward a cylindrical bore 39c near the end of the nipple and of a diameter equal to that of bore 30c. The end of nipple 39 flares outward to form a flared portion 39d in opposing relation to flared portion 30d. The flared portion 39d forms a shoulder 39e with the outer cylindrical wall of nipple 39. An inner collar 40 encircles a portion of the flared portion of nipple 39, and abuts the shoulder 39e which opposes movement toward the spacer ring 37. Bonded to an outer spherical surface of collar 40 is an elastomeric body 41, which also is bonded to an inner spherical surface of an outer collar 42 encircling nipple 39. The structure of collar 40, body 41 and collar 42 is of the same type as the before described collar 32, body 33 and collar 34, respectively. The elastomeric body 41 cooperates with collars 40 and 42 to form an elastomeric bearing for nipple 39. The collar 42 is captured within the housing 31 by a retainer ring 43. The retainer ring is secured by threaded fasteners 44 to the housing 31 at an end opposite to that of retainer ring 35.

The nipple 39 has an inner spherical surface 39f which is mated slidably with an outer spherical surface of the spacer ring 37. The spherical surface 39f, the outer spherical surface of collar 40, the rings comprising elastomeric body 41, and the inner spherical surface of collar 42 are concentric about the point 38.

In operation, structural members which are to be interconnected are joined to nipples 30 and 39, respectively. When the nipples 30 and 39 are compressed inward, the spherical surfaces 30f and 39f are pressed against the outer spherical surfaces of spacer ring 37. When a tensile load is applied to the nipples 30 and 39, the nipples are pulled away from the spacer 37 to compress the elastomeric bodies 33 and 41. When the longitudinal axes of the nipples 30 and 39 deviate angularly from the longitudinal axis of housing 31, the inner spherical surfaces 30f and 39f slide along the outer spherical surfaces of spacer ring 37. Further, a shear force is experienced by the elastomeric bodies 33 and 41. With the spherical geometry of the connector centered at the common center point 38, however, no wear occurs to the interfacing structural surfaces and to the elastomeric bearings. The stops 37b and 37c limit the rotation of spacer ring 37 under tensile, compressive and lateral loads.

Figure 3:
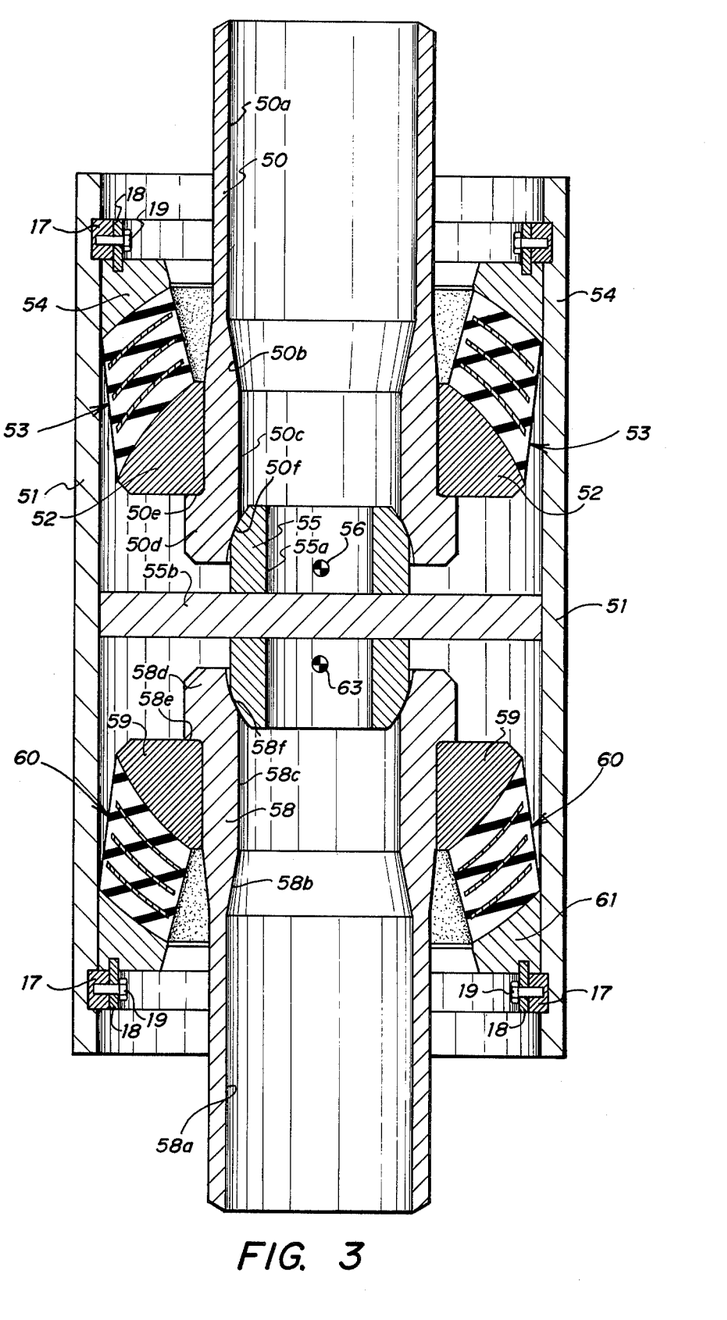
FIG. 3 is a cross-sectional view of a second modified form of the embodiment of FIG. 1.

Referring to FIG. 3, a third embodiment of the invention is illustrated in which housing 51 is elongated with the centers of curvature for upper and lower bearings displaced one from the other. This embodiment is employed for tension bearing purposes only and in the form shown does not accommodate fluid flow it being intended that tension bearing cables or tubes are welded or otherwise anchored in nipples at opposite ends of the unit. A first nipple 50 depends into a cylindrical housing 51. The nipple has an inner cylindrical bore 50a leading to an inner bore 50b having the shape of a frustum. The bore 50b in turn leads to a cylindrical bore 50c near the end of the nipple. The end of nipple 50 is flared outward to form a flared portion 50d having a shoulder 50e.

A collar 52 abuts the shoulder 50e and encircles the nipple 50. Bonded to an outer spherical surface of collar 52 is an elastomeric body 53, which also is bonded to an inner spherical surface of a collar 54. The collar 54 encircles nipple 50 and slidably mates with the inner surface of housing 51.

The elastomeric body 53 includes an assembly of spaced apart and structurally stiff rings which preferably are of metal. The rings are spaced apart one from another by elastomeric pads as before described with elastomeric bodies 14 and 23 of FIG. 1. The body 53 and collars 52 and 54 form an elastomeric bearing for nipple 50.

An inner spherical surface 50f of nipple 50 is mated slidably with an outer spherical surface of a rigid spacer ring 55. The surface 50f, the outer spherical surface of collar 52, the rings of elastomeric body 53, and the lower spherical surface of collar 54 are centered at a first common point 56. The point 56 is located on the longitudinal axis of housing 51 adjacent the end of nipple 50.

The collar 54 is captured within housing 51 by structure including a segmented retainer ring 17, ring 18 and bolts 19 as in FIG. 1.

Spacer ring 55 includes an inner cylindrical bore 55a which is aligned with the longitudinal axis of housing 51, and which is of a diameter smaller than that of bore 50c. Ring 55 further includes a central transverse disc 55b in fixed or sliding contact with the inner surface of housing 51. Disc 55b serves as a platform for contact and/or support of ring 55.

A second nipple 58 depends into the opposite end of housing 51. The nipple includes an inner cylindrical bore 58a leading to a frustum shaped bore 58b, which in turn converges toward a cylindrical bore 58c near the end of the nipple. The nipple end flares outward to form a flared portion 58d having a shoulder 58e. An inner spherical surface 58f of nipple 58 is slidably mated with an outer spherical surface of spacer ring 55.

A collar 59 abuts the shoulder 58e and encircles a lower portion of the nipple 58. An elastomeric body 60 of the same type as body 53 is bonded to the outer spherical surface of collar 59, and further bonded to an inner spherical surface of a collar 61. Collar 61 encircles nipple 58 and slidably engages the inner surface of housing 51. The collar 61 is captured within housing 51 by structure including segmented retainer ring 17, ring 18 and bolts 19 as in FIG. 1. The elastomeric body 60 and collars 59 and 61 form an elastomeric bearing for nipple 58.

The spherical surface 58f, the outer spherical surface of collar 59, the rings of elastomeric body 60 and the inner spherical surface of coller 61 are centered at a second common point 63. Point 63 is located on the longitudinal axis of housing 51 adjacent the end of nipple 58. By the structure of FIG. 3, an elongate body provides for anchoring various auxiliary equipment to the exterior of housing 51 while providing the flexibility desired through the coupling.

In operation, when a compressive load is applied to nipples 50 and 58, the nipples are pressed against the outer spherical surfaces of spacer ring 55. When a tensile load is applied to nipples 50 and 58, the nipples are pulled away from the spacer 55 and the elastomeric bodies 53 and 60 are compressed. When either of nipples 50 and 58 deviate angularly from the longitudinal axis of the housing 51, the inner surface of the nipple slides along an outer spherical surface of the spacer 55. Further, the elastomeric body associated with the nipple experiences a shear force. The spacer ring 55 is limited in rotation under load conditions by transverse disc 55b. The spherical geometry associated with each nipple accommodates such load conditions with minimal wear to the elastomeric bearings and interfacing surfaces.

Figure 4:
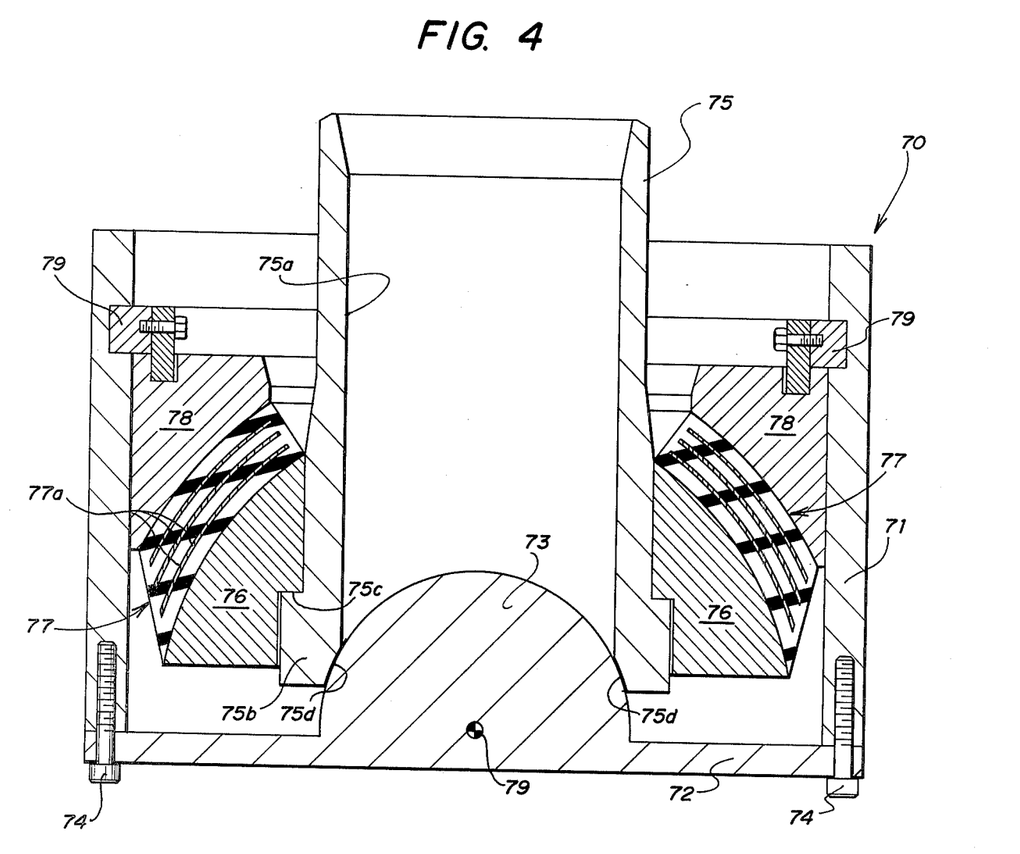
FIG. 4 is a cross-sectional view of a single acting connector embodying the invention.

Referring to FIG. 4, a single acting connector 70 is illustrated which embodies the invention. More particularly, one end of a cylindrical housing 71 is closed off by a base plate 72 having an inward facing and rigid central spherical spacer 73. The base plate 72 is secured to the end of housing 71 by threaded fasteners 74. Base plate 72 may be secured directly to a foundation rather than through a rod, tube, or cable as in FIGS. 1–3.

A nipple 75 having a cylindrical inner bore 75a depends into the open end of housing 71. The end of the nipple internal to housing 71 is subtended by an outer flange 75b which forms a shoulder 75c. Inner spherical surface 75d of nipple 75 slidingly mates with the surface of spherical spacer 73.

An inner collar 76 encircles the nipple 75, and abuts the shoulder 75c which opposes motion toward the spherical spacer 73. An elastomeric body 77 is adhered to an outer spherical surface of collar 76 and to an inner spherical surface of an outer collar 78. The elastomeric body 77 includes an assembly of spaced apart and structurally stiff rings 77a, which preferably are of metal. The rings are spaced apart one from another by elastomeric pads, and are completely encased within the elastomeric body. The collar 78 encircles the nipple 75 and slidably engages the inner surface of housing 71.

The inner spherical surface of collar 78, the rings 77a, the outer spherical surface of collar 76 and the surfaces 75d are concentric to a common point 79. Point 79 is located on the longitudinal axis of housing 71.

The collar 78 is captured within housing 71 by a segmented retainer 80 which is of the same type as retainers 17 and 25 of FIG. 1.

The embodiment illustrated in FIG. 4 is a tension bearing unit which may serve as a cable termination. If a compressive load is applied to nipple 75, the inner surfaces 75d slidably mate with the outer surface of the spacer 73. If the nipple 75 is subjected to tensile forces, however, the elastomeric body 77 is compressed. Further, angular deviation between the longitudinal axis of nipple 75 and the longitudinal axis of housing 71 may be accommodated. With the spherical geometry of the connector centered at the common point 79, such angular deviation may occur with minimal wear to either the elastomeric body 77 or to the interfacing structural surfaces.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A flexible connector for accommodating tensile loads at a junction between structural members, which comprises:
  (a) a hollow cylinder;
  (b) a pair of nipples depending into said cylinder from opposite ends thereof, said nipples having outwardly flared ends and longitudinal bores subtended by internal spherical surfaces adjacent said flared ends;
  (c) a rigid spacer located in said cylinder and interposed between said nipples, said spacer having outer spherical surfaces slidably mating with said internal spherical surfaces;
  (d) a pair of elastomeric bearings each encircling one of said nipples and captured against movement out of the ends of said cylinder, each of said bearings having spherical surfaces concentric to said internal spherical surfaces; and
  (e) annular confronting surfaces on each of said nipples and on each of said bearings exterior of said flared ends and lying in planes normal to said axis to transfer to said bearings forces which would urge said nipples away from said spacer.

2. The combination set forth in claim 1 wherein each of said bearings includes:
  (a) an outer collar encircling one of said nipples and slidably engaging said cylinder, said outer collar having an inner collar surface concentric to said internal spherical surfaces;
  (b) an inner collar encircling said one of said nipples and supported by a related one of said flared ends against movement away from said spacer, said inner collar having an outer collar surface concentric to said internal spherical surfaces; and
  (c) an elastomeric body interposed between and bonded to said inner collar surface and said outer collar surface.

3. The combination set forth in claim 2 wherein said elastomeric body includes an assembly of structurally stiff rings spaced apart one from the other by elastomeric pads, and wherein said rings are concentric to said internal spherical surfaces.

4. A tension bearing unit, which comprises:
  (a) a cylinder having a base portion;
  (b) a central rigid spacer supported in said cylinder with an outer spherical surface facing away from said base portion, and having its center of curvature at the axis of said cylinder;
  (c) a nipple having an internal spherically shaped surface contiguous to said spacer in a mating relation;
  (d) an elastomeric bearing having an end inner ring which has a cylindrical center bore to receive said nipple and an end outer ring having a cylindrical outer surface to mate inside said cylinder and an intermediate elastomeric section having spherical surfaces centered at the center of curvature of said spacer, said bearing encircling said nipple with annular planar bearing surfaces oppositely facing and normal to said axis; and
  (e) structure forming a stop on said nipple and a stop on said cylinder to contact said annular planar bearing surfaces to transfer through said bearing to said cylinder forces which would urge said nipple away from said spacer.

5. The combination set forth in claim 4 wherein said spacer has an internal cylindrical bore aligned with the longitudinal axis of said cylinder.

6. The combination set forth in claim 4 wherein said spacer includes surface structure forming stops to limit the angular deviation of said spacer nipple.

7. A system for interconnecting structural members subjected to tension, compression and lateral forces which comprises:
  (a) a cylindrical housing;
  (b) a pair of opposing nipples having inner bores subtended by inner spherical surfaces with a common center of curvature on the longitudinal axis of said housing, and exterior annular planar surfaces perpendicular to said axis and each facing a mouth of said cylinder;
  (c) a rigid spacer interposed between said nipples and having an outer spherical surface complementary to said inner spherical surfaces;
  (d) a pair of elastomeric bearings each encircling one of said nipples and supporting said nipples against movement away from said spacer by inner surfaces of said bearing flared in a plane perpendicular to said axis in contact with said annular surfaces on said nipples, said bearings having spherical surfaces centered at said center of curvature; and
  (e) retainer means secured to said housing for opposing movement of said nipples in response to tensile forces.

8. In a tension bearing unit where a cylinder having a base portion in which a central rigid spacer is supported with an outer spherical surface facing away from said base portion, and having its center of curvature at the axis of said cylinder and wherein a nipple has an internal spherically shaped surface contiguous to said spacer in a mating relation, the combination comprising:
  (a) an elastomeric bearing having an end inner ring which has a cylindrical center bore to receive said nipple and an end outer ring captured in the mouth of said cylinder and an intermediate elastomeric section having spherical surface centered at the center of curvature of said spacer, said bearing encircling said nipple with an annular planar bearing surface normal to said axis and facing away from said end outer ring; and (b) structure forming a planar stop on said nipple to contact said annular planar bearing surface to transfer to said bearing forces which would urge said nipple away from said spacer.

9. The combination set forth in claim 8 in which said spacer includes cylindrical limit structure extending into the end of said nipple.

10. The combination set forth in claim 8 in which said spacer includes cylindrical limit structure an end of which faces the end of said nipple.

11. The combination set forth in claim 8 in which said spacer is fixed to said cylinder.

12. The combination set forth in claim 8 in which said spacer is free floating adjacent to the end of said nipple.

* * * * *

UNITED STATES PATENT AND TRADEMARK OFFICE
CERTIFICATE OF CORRECTION

PATENT NO. : 4,098,527
DATED : July 4, 1978
INVENTOR(S) : John T. Herbert; Frank J. Kovitch; Paul E. Sullivan.

It is certified that error appears in the above-identified patent and that said Letters Patent are hereby corrected as shown below:

In References Cited, delete:
```
"1,343,445  6/1920   Gaffers ..... 52/657";
"3,818,672  6/1974   Moore, Sr. ..... 403/295";
"1,000,117  11/1976  Canada ..... 403/402".
```

Column 6, line 22, change "coller" to --collar--.

Column 8, line 66, change "surface" to --surfaces--.

Signed and Sealed this

Second Day of January 1979

[SEAL]

Attest:

RUTH C. MASON
Attesting Officer

DONALD W. BANNER
Commissioner of Patents and Trademarks